April 8, 1958     I. A. HALPERN     2,829,459
CAKE DISC
Filed Oct. 4, 1954
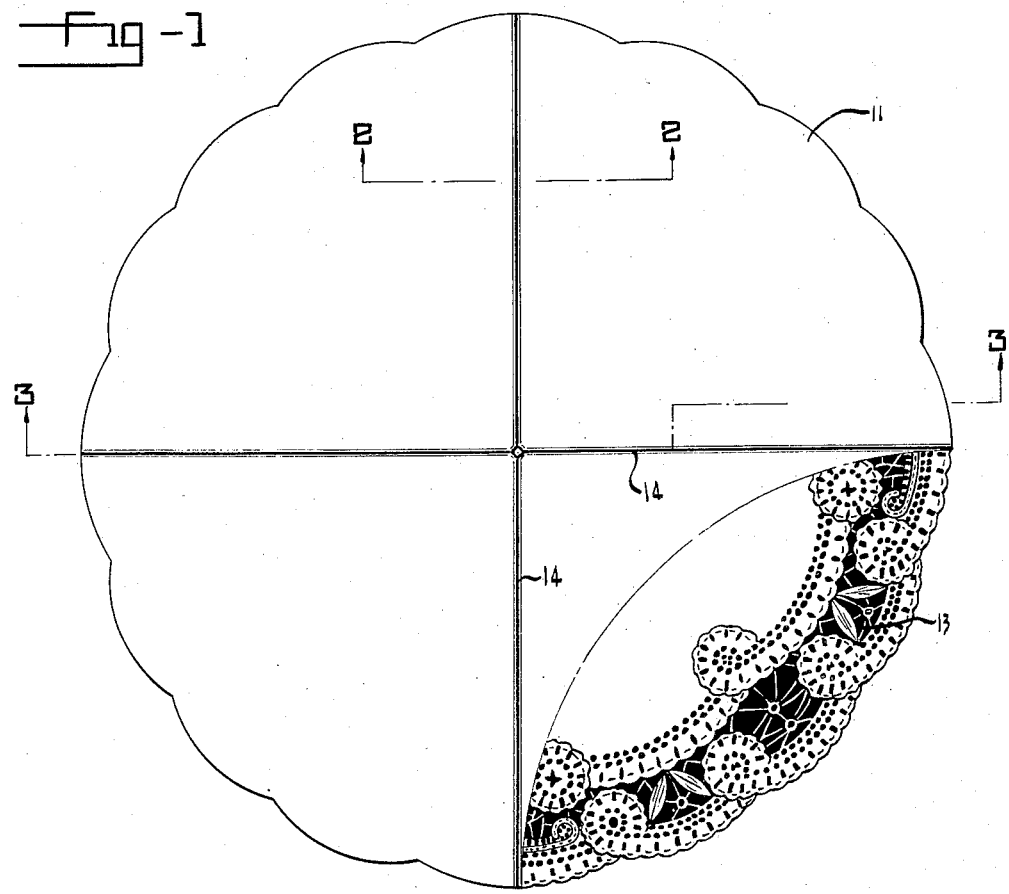
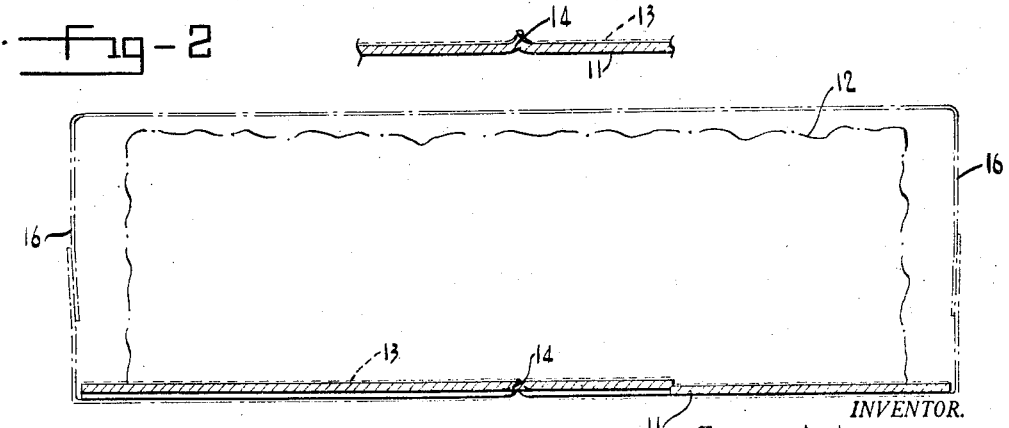
INVENTOR.
ISRAEL A. HALPERN
BY
Townsend, Townsend & Hoppe
ATTORNEYS United States Patent Office 2,829,459
Patented Apr. 8, 1958

2,829,459
CAKE DISC

Israel Alfred Halpern, Daly City, Calif., assignor to Item Development Engineering Associates, a corporation of California Application October 4, 1954, Serial No. 460,017

1 Claim. (Cl. 41—10)

This invention relates to a new and improved cake disc on which pastry may be placed while being decorated and/or prior to the time that it is placed in a pastry box and sold to the consumer. The disc is characterized by the fact that it is formed of newsboard printed or lithographed on one surface with a pattern resembling a doily, the ink used in printing the pattern of the doily, or the complement thereof, being of a grease-repelling nature, and further characterized by the presence of a plurality of upstanding ridges on the surface of the disc which engage the underside of the pastry and prevent shifting of the pastry relative to the disc.

The purposes of cake discs of the nature of this invention are numerous. One purpose is to provide a firm base for holding the cake while it is being decorated with icing, or the like. During this operation the icing or the grease in the pastry may stain the newsboard. A second purpose of the disc is to facilitate transfer of cake or other pastry from the counter of a bakery into the pastry box in which it is sold. For this purpose a doily is usually placed on the disc and the cake is placed on the doily prior to the time that it is placed on sale on the counter and hence the attendant can easily move the cake from the counter after it is selected by the customer. Removing the cake from the disc on which it has been decorated and placing it on a disc carrying a doily is time-consuming and may damage the cake. Another use of the disc is the fact that it is usually slightly larger in size than the cake thereby preventing the pastry from being damaged by contact with the sides of the box while the pastry is being carried. Still another purpose is to facilitate handling by the consumer prior to serving the pastry.

Prior pastry discs of this nature have been formed of a plain paperboard material known commercially as "newsboard," a porous material. In using such prior discs it is generally necessary to place a paper doily over the surface of the disc in order to cover the newsboard and to enhance the appearance of the product. The use of the doily is an added expense and also is labor-consuming. Another disadvantage of prior discs of this general nature is the fact that the paper is grease-absorbent and hence presents an unsightly appearance when the grease in the cake or icing is absorbed therein.

Accordingly, one of the features of the present invention is the elimination of the use of the separate doily by printing or lithographing the pattern of the doily directly onto the surface of the disc. Still another feature of the invention is the fact that the printing is done with grease-repellent ink which prevents grease in the cake or icing from being absorbed by the disc and accordingly avoids the unsightly appearance of prior discs.

Other objects of the present invention will become apparent upon reading the following specification and referring to the accompanying drawings in which similar characters of reference represent corresponding parts in each of the several views.

Fig. 1 is a top plan of the disc partially illustrating the doily pattern.

Fig. 2 is a fragmentary sectional view thereof.

Fig. 3 is a schematic vertical section through a pastry box showing use of the device to support pastry.

As illustrated in the accompanying drawings, a disc 11 of any suitable size and shape is provided, the size being slightly larger than that of the pastry 12 with which the disc is to be used. The disc 11 is formed of conventional newsboard and is relatively inflexible, light in weight and low in cost.

One surface of the disc is printed in a design 13 simulating that of a conventional linen or paper doily.

The upper surface of the disc may first be printed with white ink to provide a contrast to the complementary dark ink which brings out the pattern 13 of the doily. However, the use of white ink may be eliminated. The pattern 13 of the doily is formed by an offset photographic printing or lithographic process using a dark ink such as dark brown or black in a pattern complementary to the pattern of the doily design.

The ink employed is characterized by incorporation in its formula of a small quantity of vanillin. Thus, for a dark brown ink, a formula employing six ounces of binding varnish, six ounces chrome yellow, two ounces of toner red, one ounce of one-half gloss black, 60–60, one-eighth ounce vanillin and one-quarter ounce dryer may be employed. The foregoing formulation is merely illustrative of one color which may be employed, the combination of the binding varnish, the chrome yellow and the toner red make the ink substantially grease-resistant or repellent. The vanillin further masks the odor or the other ink ingredients, thereby preventing contamination of the pastry by an unpleasant odor from the ink. The formulation, further, is safe for direct contact with food.

After the disc 11 has been printed, a plurality of upstanding ridges 14 may be formed in the disc in any suitable pattern and by any suitable means, such as embossing. When a cake 12 is placed on top of the disc 11, as shown particularly in Fig. 3, the ridges 14 form complementary grooves in the relatively soft underside of the pastry and thereby prevent the pastry from shifting or sliding relative to the disc 11.

As shown in Fig. 3, the disc 11, being of larger size than the pastry 12, contacts the sides 16 of the pastry box and prevents the sides of the pastry from coming in contact with the sides of the box. By reason of the presence of the ridges 14 on the disc, a shifting of the cake relative to the disc is prevented.

In the manufacture of the device, a plurality of discs 11 is formed from a single sheet of material, and the individual discs are subsequently die cut from the larger sheet. If white ink is employed, a white spot slightly larger than the disc is first applied to the paper. A plate is made, preferably by a photo-engraving process, of a doily pattern. Subsequently, the dark color ink 13 is printed on the disc 11 in a pattern complementary to the pattern of the doily. After die cutting and forming of the ridges 14, which may be performed in a single operation of a press, the discs are completed.

In use, the cake 12 is placed in the center of the disc 11, the ridges 14 gripping the underside of the cake. The cake may be decorated by holding the disc in the hand. Surplus icing may readily be wiped off the doily surface. The grease of the cake is repelled by the ink and does not stain the disc. It is understood, of course, that it is not necessary to use the disc for decoration. In any event, the cake is displayed on the disc and, after being selected by the customer, is conveniently placed in the pastry box, where it functions to prevent the cake from coming in contact with the sides 16 of the box. The disc also facilitates removing the cake from the box and serving.

Although the foregoing invention has been described in some detail by way of illustration and example for purposes of clarity of understanding, it is understood that certain changes and modifications may be practiced within the spirit of the invention and scope of the appended claim.

What is claimed is:

A disposable pastry supporting article comprising a substantially flat disc shaped plate formed of normally liquid absorbent paperboard material, one side of said plate disposed to support an item of pastry, said pastry support side of said plate covered by a grease-resistant coating to prevent absorption by said paperboard material or greasy substances associated with pastry, said coating disposed in a pattern comprising various tones to form a decorative face on the supporting surface of said plate, and said plate formed with a plurality of ridges projecting from the centermost portion of said plate radially therefrom on the pastry engaging surface of said plate to frictionally hold pastry on said surface in a relatively fixed position with respect to said plate said ridges being formed of sufficiently shallow dimension to allow the bottom portion of the cake to rest on the pastry engaging surface of said plate.

References Cited in the file of this patent

UNITED STATES PATENTS

| | | |
|---|---|---|
| 437,781 | Higgins | Oct. 7, 1890 |
| 476,340 | Wagandt | June 7, 1892 |
| 1,915,676 | Krueger | June 27, 1933 |
| 1,961,342 | De Reamer | June 5, 1934 |
| 2,235,798 | Collings | Mar. 18, 1941 |
| 2,610,111 | Stanley | Sept. 9, 1952 |

FOREIGN PATENTS

| | | |
|---|---|---|
| 107,867 | Switzerland | Dec. 16, 1924 |
| 715,967 | France | Oct. 5, 1931 |
| 919,443 | France | Nov. 25, 1946 |

OTHER REFERENCES

Printing Inks, Ellis, April 1940, Reinhold Pub. Co., page 437, 4 lines from bottom, pages 390–392.